Figure 5:
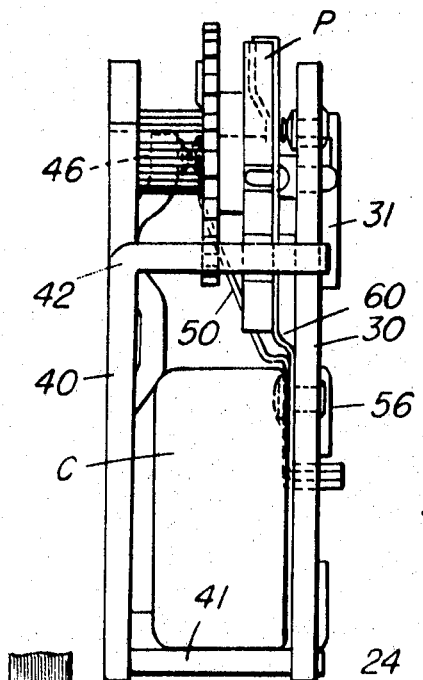

United States Patent
Corey et al.

[15] 3,648,142
[45] Mar. 7, 1972

[54] INFINITE SPEED CONTROL SWITCHING DEVICE FOR USE WITH ELECTRIC MOTORS IN PORTABLE TOOLS

[72] Inventors: Lawrence G. Corey, Rockville; David W. Johnson, Newington, both of Conn.

[73] Assignee: Arrow-Hart, Inc.

[22] Filed: Nov. 21, 1969

[21] Appl. No.: 878,613

[52] U.S. Cl. ............................................. 318/345, 310/50
[51] Int. Cl. ....................................... H02p 7/28, H02k 7/14
[58] Field of Search ............... 310/50, 47; 318/345; 200/157; 338/200

[56] References Cited

UNITED STATES PATENTS 3,536,973  10/1970  Matthews et al. .................. 338/200 X
3,329,842  7/1967  Brown ............................... 310/50 X
3,447,057  5/1969  Brown et al. ....................... 310/50 X

*Primary Examiner*—Lewis H. Myers
*Assistant Examiner*—H. Huberfeld
*Attorney*—Davis, Hoxie, Faithfull & Hapgood

[57] ABSTRACT

A trigger-operated power control switch for electric motors in portable tools, wherein control circuitry including a condenser, a fixed resistor, a silicon-controlled rectifier, a neon tube, and a potentiometer or variable resistance with which is combined switching means for isolating these parts from the source of power by opening the circuit in both powerline conductors in "off" position and for bypassing said control circuitry in full "on" position. The trigger operates the potentiometer and also controls the switching operations.

8 Claims, 10 Drawing Figures

Patented March 7, 1972
3,648,142
3 Sheets-Sheet 1
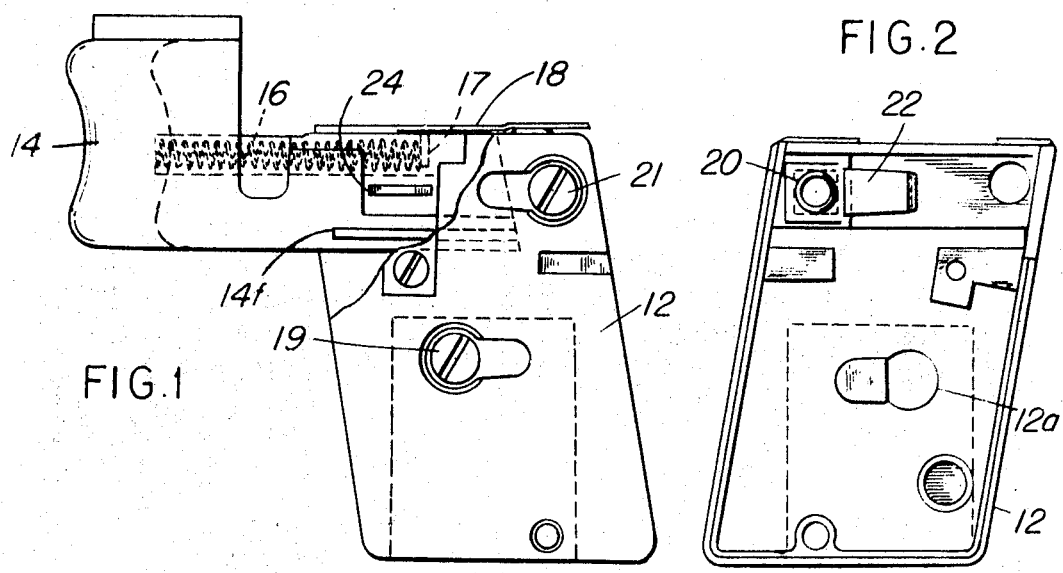
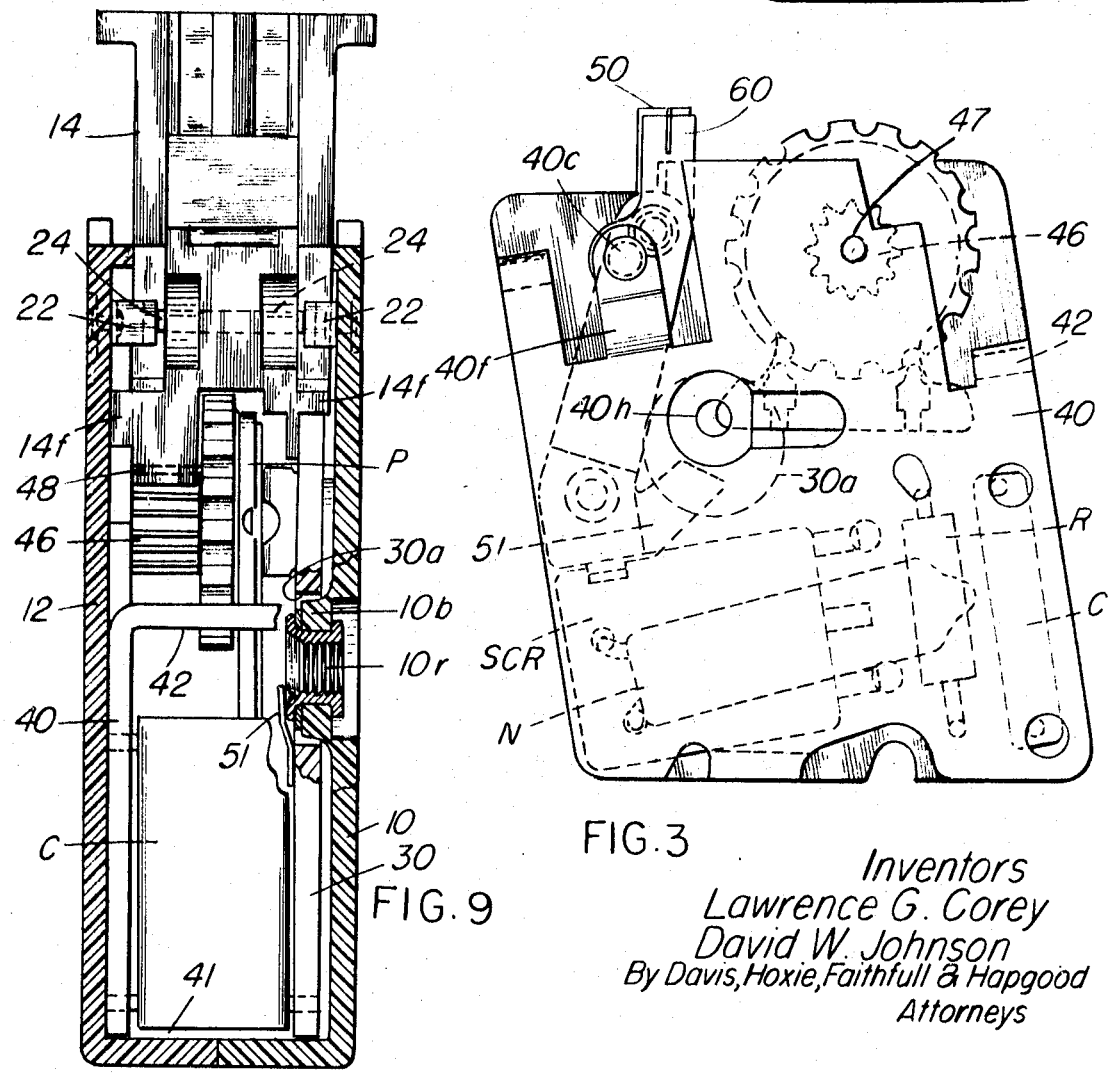
Inventors
Lawrence G. Corey
David W. Johnson
By Davis, Hoxie, Faithfull & Hapgood
Attorneys Patented March 7, 1972

3,648,142

3 Sheets-Sheet 2

Inventors
Lawrence G. Corey
David W. Johnson
By Davis, Hoxie, Faithfull & Hapgood
Attorneys Inventors
Lawrence G. Corey
David W. Johnson
By Davis, Hoxie, Faithfull & Hapgood
Attorneys

INFINITE SPEED CONTROL SWITCHING DEVICE FOR USE WITH ELECTRIC MOTORS IN PORTABLE TOOLS

This invention relates to electric switches. More particularly, it relates to an electric switching device for the control of electric motors and other translating devices by the method commonly known as phase shifting.

The invention is an improvement upon and further development of the invention described in copending application Ser. No. 469,218. Electric switching devices for controlling the delivery of power to and speed of electric motors and other translating devices by phase shifting as disclosed in said application have been known and been successful in use. That type of switch is used in series with the controlled motor or other controlled device. It is desirable however to have the controlled device, and particularly motors of portable electric power-operated tools, disconnected from both sides of the powerline when not in operation. Also, due to variations inevitably occurring during manufacturing and assembling of components and combinations, it is desirable to provide an adjustment so that when the completed switches are put into use, such as in control of power tools, the tools will all operate in the same way when the triggers or control elements are moved equal distances in identical tools.

Thus it is an object of this invention to provide a switch for controlling the power delivered to portable power-operated electric drills and other tools and devices which can open the circuit in both feedlines when not in use and which has provision for one adjustment to compensate for manufacturing variations so that uniform results can be obtained in use from all identical controlled apparatus.

Another object is to provide improvements in arrangement and construction of such devices to make them suitable for hard, continuous industrial use.

Other objects and advantages will become apparent as the invention is described in connection with the accompanying drawings.

Referring to the drawings

Figure 4:
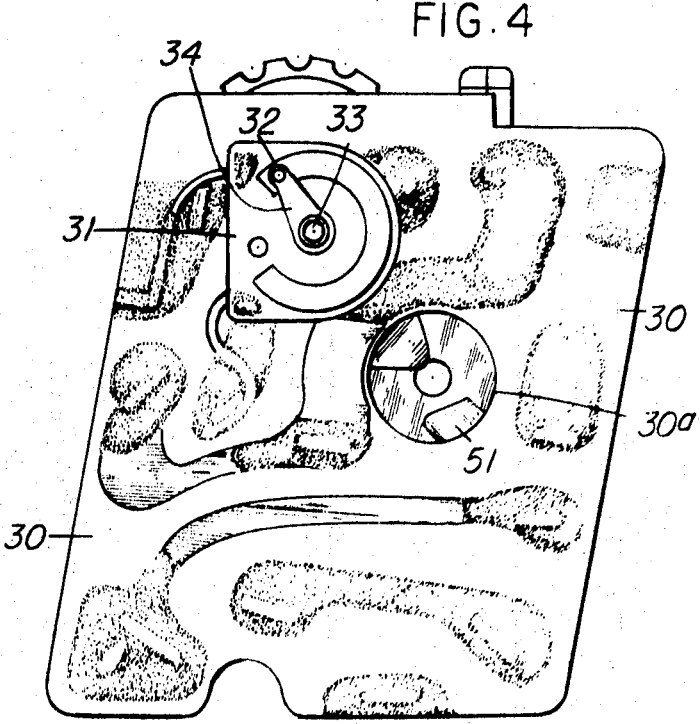
Figure 6:
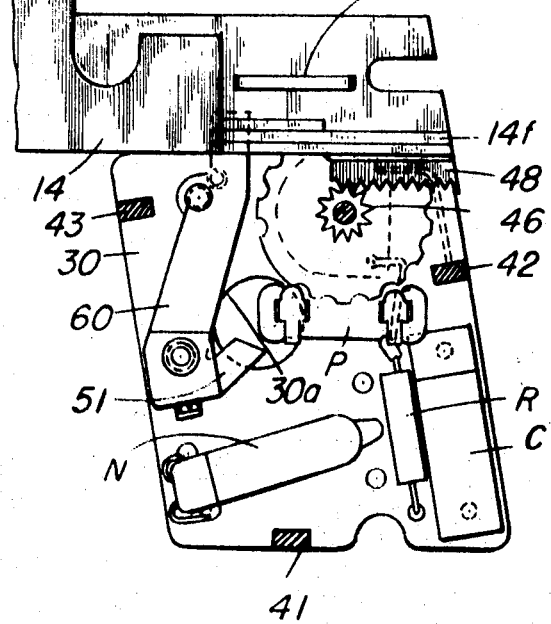
Figure 8:
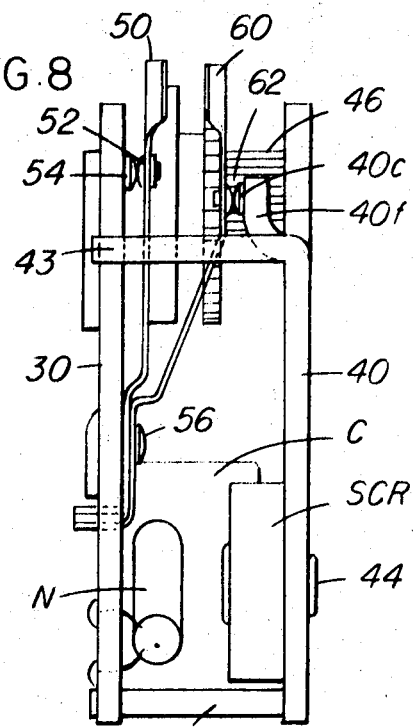
Figure 10:
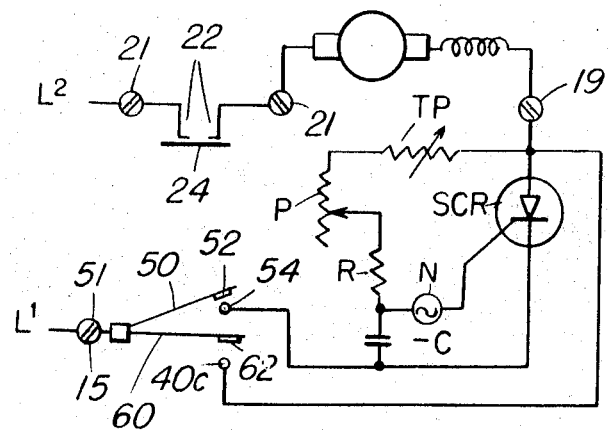
Figure 7:
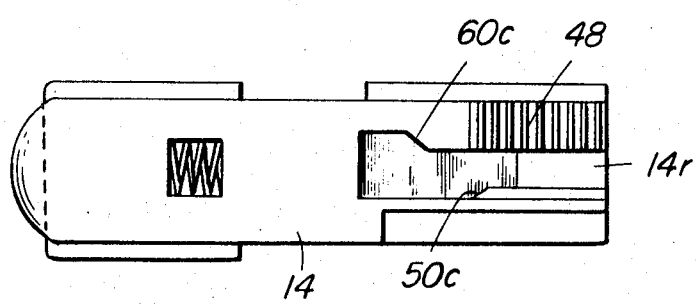

FIG. 1 is a side elevation view of a system control switch embodying the invention with a portion of the casing broken away, FIG. 2 is an elevation view showing the inside of one-half of the casing of the device illustrated in FIG. 1, FIG. 3 is a side elevation view of the operating mechanism removed from the device of FIG. 1, on an enlarged scale, FIG. 4 is a side elevation view similar to FIG. 3 but of the opposite side of the mechanism, FIG. 5 is an end elevation view looking into the left side of FIG. 3, FIG. 6 is a view similar to FIG. 3 but with one plate removed and with the trigger shown partially broken away, FIG. 7 is a bottom plate view of the trigger, FIG. 8 is an end elevation view of the parts illustrated in FIG. 3 viewed from the right side, FIG. 9 is an end elevation view partly broken away similar to FIG. 5 on an enlarged scale with the trigger engaged, FIG. 10 is a diagrammatical view of the circuit connections of the device illustrated in the previous figures of the drawings.

Referring to the drawings, the parts are housed within a hollow casing molded from insulating material. The casing comprises a base half 10 and a cover half 12 fitting upon and cooperating with the base half. They are similar in shape and configuration but not identical. When put together they enclose all operating parts.

Extending from the casing is an operating member 14 of the trigger type, molded from insulating material. The finger grip portion of the operating member lies outside the casing while the operating portion extends into the casing at one side and is recessed in one surface semicylindrically to receive a coiled compression spring 16. One end of this spring presses against the trigger while its other end presses against a projection 17 extending from a sheet metal bracket 18 so as to normally bias the trigger outwardly of the casing. The bracket 18 may be partly U-shaped and secured to the casing over the spring and over the inwardly extending portion of the trigger.

Flanges 14f (FIGS. 1, 6 and 9) protrude laterally from the trigger and extend lengthwise thereof, and slide in guideways (not visible) formed on the inner sidewalls of the casing sections, to guide the rectilinear movement of the trigger.

In each of the casing halves, in the upper right corner (as viewed in FIG. 1, the upper left in FIG. 2) there is embedded a hollow rivet 20 which extends through the casing wall and is tapped to receive an exterior terminal screw 21. The inner end of the rivet passes through a hole in one end portion of a thin resilient sheet metal contact finger 22 in the form of a short strip which extends inwardly along the top edge of the casing. The rivet is peened over to secure the contact finger against the inside wall of the casing half. These two contact fingers are in directly opposite positions in the casing halves. In use, one of the terminal screws 21 is used for connection of a powerline and the other is used to connect a lead to a motor of a power tool or other controlled device. In order to close or open the circuit in one powerline $L^2$ as the trigger is moved by finger pressure or retracted by pressure of the biasing spring 16, a bridging contact member 24 in the form of a piece of metal is embedded in and extends transversely thru the trigger in position for its extensions 24 to engage and bridge the flexible contact fingers 22 immediately as the trigger is pressed and to maintain contact during the remainder of the travel of the trigger. Conversely when the trigger is retracted by spring 16 the bridging contact disengages the contact fingers just prior to termination of the retractive movement.

In addition to the control of power flow to the device in one line by the means just described the trigger movement controls the amount of power flow and disconnection of the other powerline from the switch and motor, by means which will now be described.

The movable and encircuited parts, other than the trigger are mounted between an insulation plate 30 and a metal stamped sheet metal plate 40 which are parallel and connected together and are, generally, in the shape of parallelograms. Metal plate 40 has three legs 41, 42 and 43 bent out of its plane at right angles to enter recesses in three different edges of the insulation plate, thus to space and secure the two plates in their spaced parallel relationship.

The insulation plate 30 has printed circuit connections on its outer surface and has mounted over and parallel to and adjacent its outer surface a calibrating or trimming potentiometer comprising a ceramic plate 31 on which is a circular resistance strip or path 32 painted or otherwise adhered on its outer face. A movable finger 34 is pivotally mounted on the plate coaxial with the resistance path 32 with its end rubbing over the path. In order that the finger 33 shall be accessible from outside the casing after assembly of the whole device within the casing an aperture (not shown) is formed in the casing half 10 over the center of the trimming potentiometer through which a thin, pointed implement can be inserted to turn the finger 33 in order to calibrate or adjust the whole assembly to give the desired response in normal usage.

The metal plate 40 acts as a heat sink for a silicon-controlled rectifier (SCR) or other similar element whose action can be controlled so as to pass current at a predetermined point or points in the alternating current cycle when a certain current or voltage signal is given. The SCR may be of the plastic-encased sort affixed flat against the plate 40 by a hollow rivet 44 passing through both.

Encircuited with the SCR as shown diagrammatically in FIG. 10 are a resistor R, neon bulb N, a capacitor C, the trimming potentiometer, and a controlling potentiometer P. These parts are all located between or on the plates 30 or 40.

The control potentiometer P is small and of the rotary type, having a pivot or shaft 47 with a pinion gear 46 mounted an extending end. The pinion is enmeshed with the teeth 48 of a rack formed on the inner edge of the trigger 14.

As the trigger slides back and forth under retractive spring pressure or under finger pressure the gear is rotated to operate the potentiometer. This controls the power flow to the motor and its speed.

To cause opening and closing of the circuit to the circuit to the other powerline L' a movable contact 50 formed of a strip of flexible sheet metal is affixed at one end to the insulating plate 30 and has a contact button 52 near its opposite end in position to engage a fixed contact button 54 mounted on the plate 30 and connected by metal plate 40 and by the printed circuit to the SCR and trimming potentiometer. For connecting the flexible contact 50 to the powerline there is a lateral tab or extension 51 (FIGS. 3, 4 and 9) from like anchored end of the contact 50 extending beneath an opening 30a (FIG. 4) in the insulation plate 30. On the casing half 10, a boss 10b is molded with a hollow rivet 10r (FIG. 9) embedded therein over the tab 51. The boss extends thru the opening 30a and the end of the rivet 10r presses against the flexible tab 51 making electrical contact therewith when the unit is assembled. The rivet 10r is internally tapped for a wire terminal screw 15 to which a wire from the powerline L' may be connected.

In order to apply full line voltage and power when the trigger is pressed to the full extent of its travel, another movable contact is provided in the form of a thin, flexible contact strip 60 which has on it near one end a contact button 62 which is biased toward engagement with a similar contact button 40c, on a rigid finger 40f which is integral with but bent into a position offset inwardly from the plane of the metal plate 40. The opposite end of the flexible contact 60 overlies the anchored end of contact 50 and is secured against it by the same rivet 56 that secures the contact 50 to insulation plate 30.

Movement of the trigger operates all the movable contacts 24, 50 and 60. The operational movement of contact 24 has already been described.

Contacts 50 and 60 are operated in sequence by cams 50c, 60c on the trigger. As will be seen by reference to FIG. 7, a bottom view of the trigger, there is a longitudinal recess 14r molded into the bottom of the trigger which widens (as the recess proceeds from one end of the trigger toward the other) due to opposed cam surfaces 50c, 60c being formed on opposite sidewalls of the recess. When the trigger is fully pressed inwardly the ends of both contacts 50 and 60 reside in the widest portion of recess 14; and since both contacts are biased close they will then be in current conductive condition.

The end of the contacts are crimped into V-shape providing an angulated surface to slide on inclined portions of the cams. The high portion of the cam parallels the direction of movement and the peak of the crimped end of the contact slides along it and maintains the contact button 52 separated from fixed contact 54. Thus both movable contacts are disengaged from their opposite fixed contacts when the trigger is fully retracted by the spring 16.

The cams disengage the movable contacts at different points of the trigger travel, the cam 50c disengaging first to allow contacts 52, 54 to close at about the same time as contact 24 bridges fixed contacts 22, thus connecting both power lines to the device.

Contact 62 and 40c close near the end of the inward trigger movement and connect the powerlines directly to the motor for full power operation.

The operation of the circuit need not be described in detail as the use of silicon-controlled rectifiers for series wound motors and other devices is now well known in the art. However, due to variations in manufacturing and assembly of the components of the combination, different operations can occur with the same degree of trigger travel in identical assemblies.

Therefore the trimming potentiometer previously mentioned is connected in the circuit as shown in FIG. 9. The trimming potentiometer comprises a small plate 31 of ceramic insulation having on its surface an arcuate resistance element 32. At the center of the arc of the resistance element is a pivot pin 33 for an oscilatable arm 34 whose free end wipes over the resistance element. The pivot pin 33 is electrically connected to one end of the resistance 32 and both are connected by a soldered wire to the metal plate 40. The opposite end of the resistance 32 is connected by a soldered wire connection to the control potentiometer through the printed circuit on insulating plate 30.

The metal plate 40 has a tapped hole 40h in its center to receive a terminal screw. To permit entry of screw 19 the casing half 12 has an aperture 12a concentric with the tapped hole 40h.

From the foregoing it will be understood that with the trigger in its normal unoperated position both powerlines are disconnected from the switch but that on finger squeezing the trigger powerline $L^2$ is connected by movement of the bridging contact and simultaneously powerline L' is connected by cam-controlled operation of flexible contact 50. Ultimately upon squeezing the trigger to the end of its travel the power-control circuitry is bypassed by operation of the flexible contact 60. On release of the trigger reverse action of the contact movements takes place to disconnect the switch entirely from the powerlines.

Many modifications will occur to those skilled in the art. Therefore the invention is not limited to the exact form and arrangement of parts illustrated and described.

What is claimed is:

1. A trigger-operated electric power control device adapted to be mounted in the housing of an electric power tool, comprising an insulation casing having two cooperating halves, a finger-operable trigger member extending into said casing and guided thereby for rectilinear motion, first stationary contact and terminal means carried by one of said halves, second stationary contact and terminal means carried by the other of said halves, bridging contact means carried by said trigger member and connecting and disconnecting said stationary terminal means as said trigger member is moved, means housed within said casing and operated by movement of said trigger member to vary electrical power, conductor terminal means mounted on one of said casing halves, normally open contact means operated by initial movement of said trigger member to electrically connect said power-varying means to said line terminal means, and normally open contact means closed by movement of said trigger member in the same direction as said initial movement to bypass said power-varying means.

2. A device as claimed in claim 1 wherein said first and second stationary contact means include resilient members and said bridging contact means comprises a conductive member molded in said trigger member.

3. A device as claimed in claim 1 having a metal plate having a wire terminal thereon, and means electrically connecting said plate to said power-varying means.

4. A device as claimed in claim 2 having a metal plate having a wire terminal thereon, and means electrically connecting said plate to said power-varying means.

5. A device as claimed in claim 4 having supporting means of insulation on which said power-varying means is mounted at least in part, and a resilient member mounted on said supporting means, said resilient member being engaged by said conductor terminal means when said casing halves are assembled.

6. A device as claimed in claim 1 having supporting means of insulation on which said power-varying means is mounted at least in part, and a resilient member mounted on said supporting means, said resilient member being engaged by said conductor terminal means when said casing halves are assembled.

7. A device as claimed in claim 1 wherein said power varying means includes a semiconductor device and means controlled by movement of said trigger member to determine the point in an alternating current cycle when said semiconductor device becomes conductive, and a manually adjustable trimming potentiometer connected to said semiconductor conduction-determining means for adjusting after final assembly the response of said determining means for a given amount of trigger movement and to compensate for manufacturing variations in the values of the assembled power-varying means.

8. A device as claimed in claim 1, wherein each casing half has a flat side and said flat sides are parallel, and wherein said first stationary contact and terminal means is carried by one of said sides and said second stationary contact and terminal means is carried by the other of said sides.

* * * * *